(12) United States Patent
Send et al.

(10) Patent No.: US 7,665,281 B2
(45) Date of Patent: *Feb. 23, 2010

(54) MACHINE FOR MAKING PACKAGING WITH FORM-FIT CONNECTION

(75) Inventors: Dietmar Send, Durach (DE); Peter Riegger, Wilpoldsried (DE); Joachim Wokurka, Landsberg (DE)

(73) Assignee: CFS Germany GmbH, Biedenkopf-Wallau (DE)

( * ) Notice: Subject to any disclaimer, the term of this patent is extended or adjusted under 35 U.S.C. 154(b) by 926 days.

This patent is subject to a terminal disclaimer.

(21) Appl. No.: 11/181,037

(22) Filed: Jul. 13, 2005

(65) Prior Publication Data

US 2007/0012708 A1 Jan. 18, 2007

(51) Int. Cl.
*B65B 7/28* (2006.01)
*B65B 47/00* (2006.01)

(52) U.S. Cl. .......................... 53/561; 53/329.2; 53/341; 53/366

(58) Field of Classification Search .................. 53/559, 53/561, 329, 329.2, 334, 341, 348, 366
See application file for complete search history.

(56) References Cited

U.S. PATENT DOCUMENTS

| | | | | |
|---|---|---|---|---|
| 1,319,082 | A | * | 10/1919 | Hulbert ................ 53/366 |
| 1,709,196 | A | | 4/1929 | Snyder |
| 2,331,472 | A | | 10/1943 | Holleck |
| 3,054,679 | A | | 9/1962 | Bradford |
| 3,076,299 | A | * | 2/1963 | Lerner ................ 53/559 |
| 3,338,027 | A | * | 8/1967 | Amberg et al. ........ 53/341 |
| 3,420,927 | A | * | 1/1969 | Corrinet ............... 53/334 |
| 3,561,057 | A | | 2/1971 | Butzko |
| 3,661,484 | A | | 5/1972 | Psota et al. |
| 3,706,174 | A | | 12/1972 | Young et al. |
| 3,754,372 | A | * | 8/1973 | Perdue ................ 53/559 |
| 3,760,563 | A | | 9/1973 | Zimmerman |
| 3,792,181 | A | | 2/1974 | Mahaffy et al. |
| 3,815,322 | A | | 6/1974 | Wyslotsky |
| 3,958,394 | A | | 5/1976 | Mahaffy et al. |
| 3,972,155 | A | | 8/1976 | Mahaffy et al. |
| 4,062,718 | A | | 12/1977 | Hay, II |

(Continued)

FOREIGN PATENT DOCUMENTS

CH 406036 7/1966

(Continued)

OTHER PUBLICATIONS

Notification of Transmittal of Translation of the International Preliminary Report on Patentability, PCT/EP2006/006778, mailed Jun. 12, 2008.

(Continued)

*Primary Examiner*—Stephen F Gerrity
(74) *Attorney, Agent, or Firm*—Dobrusin & Thennisch PC

(57) ABSTRACT

The present invention relates to a packaging with a packaging tray, into which a product for packing can be filled and which is closed with a lid, whereby at least one form-fit connection connects the packaging tray with the lid and the connection includes first and second connection elements. Furthermore, the present invention relates to a method for the production of a packaging as well as a packaging machine.

14 Claims, 4 Drawing Sheets

U.S. PATENT DOCUMENTS

| | | | | |
|---|---|---|---|---|
| 4,113,095 | A | * | 9/1978 | Dietz et al. .................. 206/508 |
| 4,866,906 | A | * | 9/1989 | Tayebi ......................... 53/366 |
| 4,932,856 | A | | 6/1990 | Merklinghaus et al. |
| 5,010,714 | A | * | 4/1991 | Medwed et al. ............... 53/559 |
| 5,328,314 | A | * | 7/1994 | Marchadour ................. 53/334 |
| 5,398,908 | A | * | 3/1995 | Kienle ........................ 249/121 |
| 5,603,203 | A | * | 2/1997 | Robache ..................... 53/559 |
| 6,311,838 | B1 | * | 11/2001 | Johnson et al. ............. 206/363 |
| 2003/0182903 | A1 | | 10/2003 | Garwood |
| 2004/0070504 | A1 | | 4/2004 | Brollier et al. |
| 2005/0022470 | A1 | | 2/2005 | Focke et al. |
| 2007/0012708 | A1 | | 1/2007 | Send et al. |
| 2007/0138192 | A1 | | 6/2007 | Send et al. |

FOREIGN PATENT DOCUMENTS

| | | |
|---|---|---|
| DE | 1145087 | 3/1963 |
| DE | 1232873 | 1/1967 |
| DE | 14 61 797 A1 | 2/1969 |
| DE | 1461797 A1 | 2/1969 |
| DE | 2052551 | 6/1972 |
| DE | 7245361 | 3/1973 |
| DE | 7414928 U | 10/1974 |
| DE | 2843166 | 4/1980 |
| DE | 3706114 | 8/1987 |
| DE | 3925746 A1 | 2/1991 |
| DE | 9110229 | 12/1992 |
| DE | 4124343 | 1/1993 |
| DE | 4214530 A1 | 10/1993 |
| DE | 19838289 | 3/2000 |
| DE | 19911709 | 9/2000 |
| DE | 19926359 | 12/2000 |
| DE | 19950532 | 7/2001 |
| DE | 10031356 A1 | 1/2002 |
| EP | 0186729 | 7/1985 |
| EP | 0367603 | 5/1990 |
| EP | 0385565 | 9/1990 |
| EP | 0489797 B1 | 1/1996 |
| EP | 0 791 538 A1 | 8/1997 |
| EP | 0791538 A1 | 8/1997 |
| EP | 0899209 A2 | 3/1999 |
| EP | 0949147 A1 | 10/1999 |
| EP | 1491317 | 12/2000 |
| EP | 1457301 | 9/2004 |
| EP | 1 493 683 A1 | 1/2005 |
| EP | 1493683 A1 | 1/2005 |
| FR | 2606364 A1 | 5/1988 |
| WO | 03/025833 | 3/2003 |
| WO | 2004/000650 | 12/2003 |
| WO | 2004/029844 | 4/2004 |
| WO | 2005/042349 A | 5/2005 |
| WO | 2005/075291 A | 8/2005 |
| WO | 2006/092288 | 9/2006 |
| WO | 2006/092289 | 9/2006 |
| WO | 2007/022804 | 3/2007 |
| WO | 2007/090654 A1 | 8/2007 |
| WO | 2008/034624 A1 | 3/2008 |

OTHER PUBLICATIONS

International Search Report PCT/WO2006/092289 Sep. 8, 2006.
International Preliminary Report on Patentability, Dated Mar. 21, 2007, Application No. PCT/EP2006/001869.
German Search Report, Application No. DE102005007868.1, dated Oct. 14, 2005.
International Search Report PCT/WO2006/092288 Sep. 8, 2006.
International Preliminary Report on Patentability, Dated May 30, 2007, Application No. PCT/EP2006/001868.
German Search Report, Application No. DE102005009870.3, dated Nov. 23, 2005.
International Search Report PCT/WO2007/022804 Mar. 1, 2007.
International Preliminary Report on Patentability, Dated Jun. 25, 2007, Application No. PCT/EP2006/003417.
German Search Report, Application No. DE102005017755.7, dated Nov. 30, 2005.
International Search Report PCT/WO2007/006551 Jan. 18, 2007.
International Preliminary Report on Patentability, Dated Nov. 9, 2007, Application No. PCT/EP2006/006778.
German Search Report, Application No. 102005033194.7, dated Mar. 21, 2006.
International Search Report, PCT/EP2007/001092, published Aug. 16, 2007, published as WO2007/090654.
Preliminary Report on Patentability, Dated May 9, 2008, Serial No. PCT/EP2007/001092.
German Search Report, Application No. 102006020361.5, dated Jan. 10, 2007.
Copending application, U.S. Appl. No. 11/817,196, filed Aug. 27, 2007.
Copending application, U.S. Appl. No. 11/817,202, filed Aug. 27, 2007.
Copending application, U.S. Appl. No. 11/911,291, filed Oct. 11, 2007.
Copending application, U.S. Appl. No. 12/278,681, filed Aug. 7, 2009.
Copending Application, U.S. Appl. No. 12/440,056, filed Mar. 10, 2009, published as WO2008/034624.
Copending Application, U.S. Appl. No. 12/441,596, filed Mar. 17, 2009, published as WO2008/046616.
Copending Application, U.S. Appl. No. 12/442,448, filed Mar. 23, 2009, published as WO2008/046526.

* cited by examiner

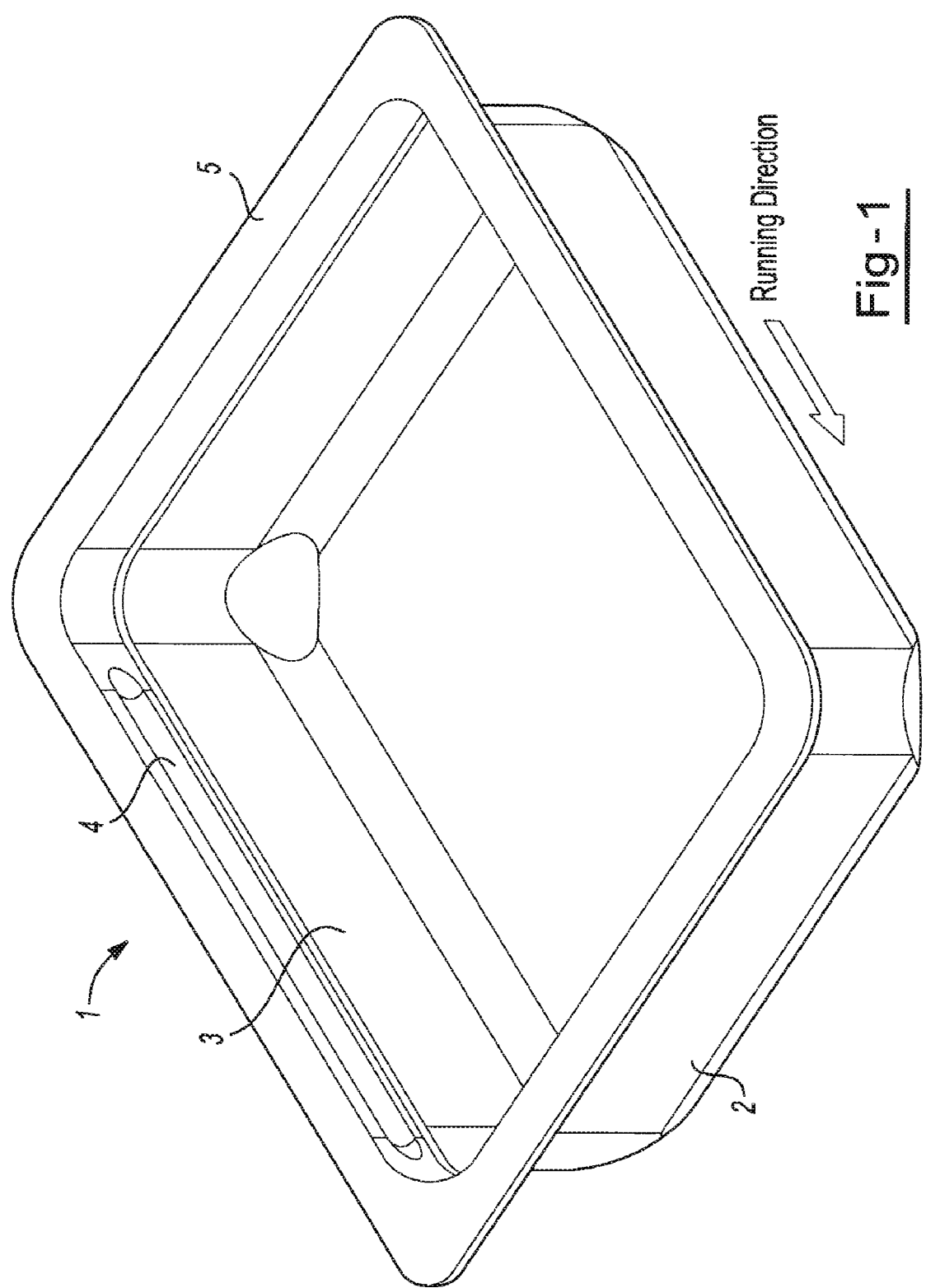

MACHINE FOR MAKING PACKAGING WITH FORM-FIT CONNECTION

The present invention relates to a packaging with a packaging tray, into which a product for packing can be filled and which is closed with a lid, whereby at least one form-fit connection connects the packaging tray with the lid and the connection comprises a first and a second connection means. Furthermore, the present invention relates to a method for the production of a packaging as well as a packaging machine.

Items of packaging as a rule comprise a packaging tray, into which the packaging material, for example foodstuff, can be filled. This packaging tray is then closed with an, as a rule, preformed lid. In order to increase the pull-off force of the lid from the packaging tray after the initial opening, it is advantageous for the re-closure capability if at least one form-fit connection is present between the lid and the packaging tray. This form-fit connection comprises two connection elements, for example a groove and a tongue, whereby the tongue is introduced into the groove.

At present, the connection elements are moulded into the lid and into the packaging tray during deep-drawing. Since the lid and the packaging tray must, however, be able to be removed again from the respective deep-drawing die after deep-drawing and one connection element must be able to be introduced into the other, the shape of the connection elements is very greatly restricted with this method.

The problem of the present invention, therefore, was to make available a packaging that does not display the drawbacks of the prior art.

This problem is solved with a packaging with a packaging tray, into which a product for packing can be filled and which is closed with a lid, whereby at least one form-fit connection connects the packaging tray with the lid and the connection comprises a first and a second connection element, wherein at least one connection element has been moulded at least partially into the packaging after the packaging tray has been closed with the lid.

It was extremely surprising for the expert and not to be expected that the packaging according to the invention can have an arbitrarily shaped form-fit connection between the lid and the packaging tray. Very great design possibilities of the form-fit connection between the packaging tray and the lid thus arise, so that the force that is required to remove the lid from the packaging tray can for example be adjusted very exactly. The packaging according to the invention can be produced in a straightforward manner and cost effectively.

According to the invention, the packaging comprises a packaging tray, into which the product for packing can be filled, and a lid. Both the packaging tray and the lid are preferably manufactured from a plastics material and are deep-drawn in each case. At least one, but preferably several, form-fit connections are arranged between the lid and the packaging tray, whereby the form-fit connection is brought about in such a way that the force that is required to detach the lid from the packaging tray is increased. The form-fit connections can be distributed arbitrarily over the circumference of the packaging. Furthermore, the form-fit connections can be combined with a joint, whereby at least one form-fit connection is then arranged opposite the hinge. Furthermore, the form-fit connections can also be used as snap connections for the re-closure of the items of packaging. According to the invention, the form-fit connection comprises a first and a second connection means, which engage into one another and thus bring about the form-fit connection. All connection elements familiar to the expert can be considered as connection elements, with which it is possible to achieve a form closure between the packaging tray and the lid. Preferably, however, the connection element is a groove and tongue connection or two spherical part-shells which engage into one another. The connection preferably extends parallel to the transport direction of the film web from which the packaging is produced. This embodiment of the present invention simplifies the dies which are required to mould the connection elements of the form-fit connection into the packaging tray and the lid and their arrangement in a packaging machine, respectively.

According to the invention, the packaging has at least one, but preferably two or more, form-fit connections.

The lid and the packaging tray are preferably sealed to one another in the region of a sealing plane. This sealing is preferably peelable, so that the packaging can be closed again by means of the form-fit connection.

A further subject-matter of the present invention is a method for the production of a packaging having a packaging tray and a lid, whereby the packaging tray is closed with the lid, wherein a form-fit connection, which connects the lid with the packaging tray, is subsequently moulded into the packaging.

With the method according to the invention, it is possible to produce items of packaging which have arbitrarily shaped form-fit connections between the packaging and the lid. The method according to the invention can be carried out in a straightforward manner and cost effectively.

In a preferred embodiment of the method according to the invention, the lid is sealed to the packaging tray before the form-fit connection has been produced.

A further subject-matter of the present invention is a packaging machine, which has an embossing means with which a connection element can be moulded into the packaging.

This embossing means is preferably mounted so as to be displaceable perpendicular to the direction of transport of the film web, so that it can be brought reversibly into engagement with the packaging tray and the lid.

The packaging machine according to the invention preferably works cyclically.

The packaging machine according to the invention also preferably has counter-bearings, with which the embossing means cooperate. By means of this preferred embodiment of the present invention, the connection means of the form-fit connection can be moulded more rapidly and more exactly into the packaging tray and into the lid.

The packaging machine according to the invention preferably has a sealing station, in which the lid is sealed to the packaging tray. The embossing means are preferably downstream of the sealing station, in relation to the running direction of the film from which the packaging tray and the lid, respectively, is produced.

The invention will be explained below with the aid of FIGS. 1 to 4. These explanations are merely by way of example and do not restrict the general ideas of the invention. The explanations apply equally to all the subject-matters of the present invention.

FIG. 1 shows the packaging according to the invention,

FIG. 1 shows the packaging according to the invention, which comprises a packaging tray 2 and a lid 3. A product for packing, for example foodstuff, can be placed into packaging tray 2. Packaging tray 2 is then closed with lid 3. After the packaging tray has been closed with the lid, form-fit connection 4 is moulded into the lid and/or the packaging tray. In the present case, the form-fit connection is moulded both into lid 3 and into packaging tray 2. The packaging according to the invention is produced on a packaging machine, whereby the packaging tray and the lid are either placed as ready moulded parts into the packaging machine or are moulded into a plane film web, for example by deep-drawing. In each case, the items of packaging are transported inside the packaging machine, preferably cyclically, along the running direction represented by the arrow. The expert will recognise that, in the present case, form-fit connection 4 is arranged parallel to the running direction of the packaging machine, which considerably simplifies the design of the packaging machine, this being explained in greater detail with the aid of FIGS. 3 and 4. The lid and the packaging tray are sealed to one another in a peelable manner in the region of the sealing plane before the form-fit connection has been moulded into the packaging.

Figure 2A:
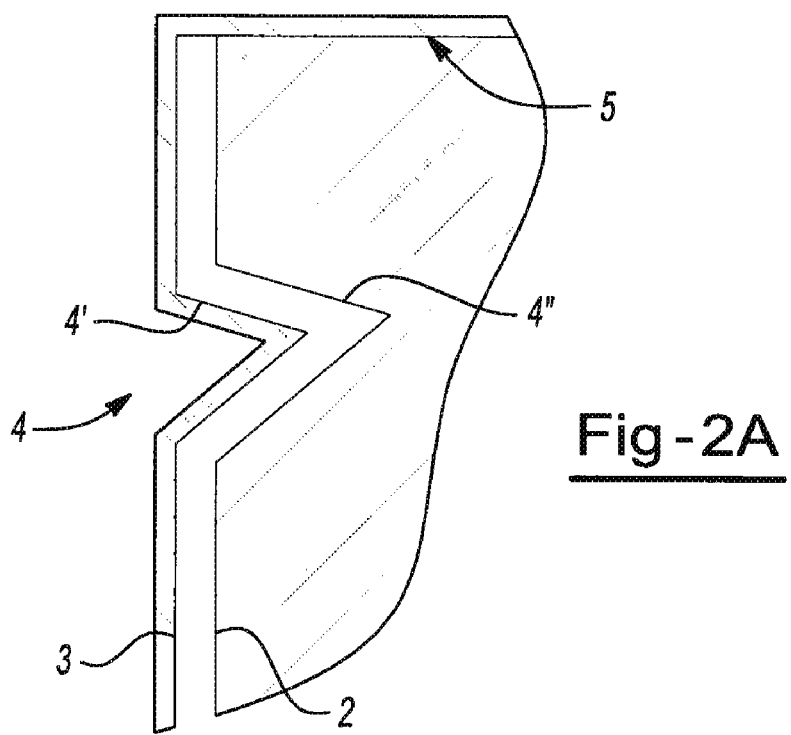
FIGS. 2A and 2B show two possible embodiments of the form-fit connection.
Figure 2B:
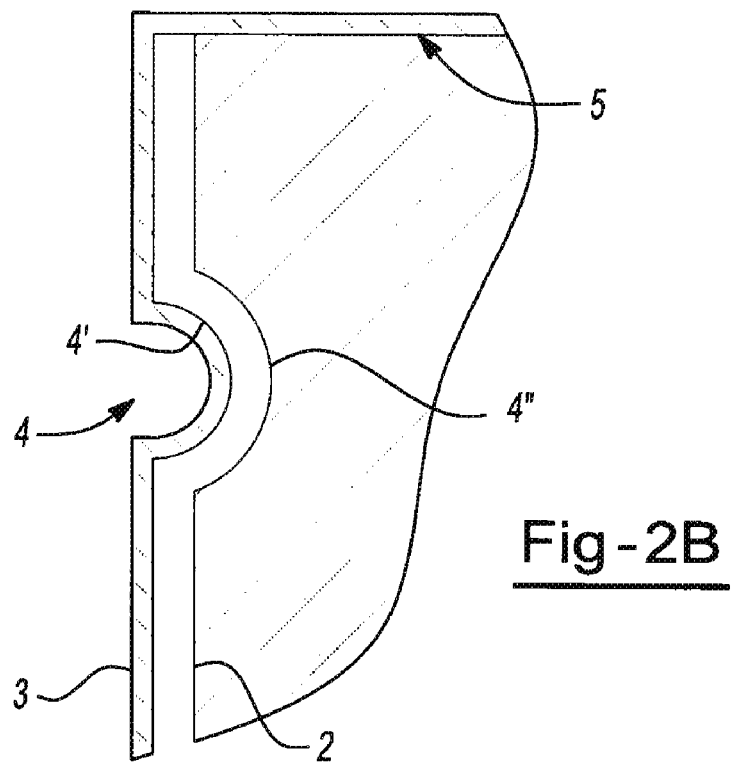

FIGS. 2A and 2B show two possible design shapes of the form-fit connection. FIG. 2A shows a groove tapering to a point, the groove extending into and out of the plane of the paper. Due to the fact that the form-fit connection is moulded into the lid 3 and the packaging tray 2 only after the lid 3 has been placed onto the packaging tray 2, it is possible to produce shapes of the form-fit connection which were not possible according to the prior art. For example, it was not possible to produce a groove 4" and tongue 4' in such a pointed fashion depicted in the left-hand representation, without the latter either no longer being able to be removed from the mould or becoming damaged during the fitting together of the lid 3 and the packaging tray 2.

FIG. 2B represents a hemispherical design of the form-fit connection. The expert will understand that it is advantageous for several such spherical form-fit connections to be arranged over the circumference of the packaging tray 2. Reference is further made to the comments concerning FIG. 2A.

Figure 3:
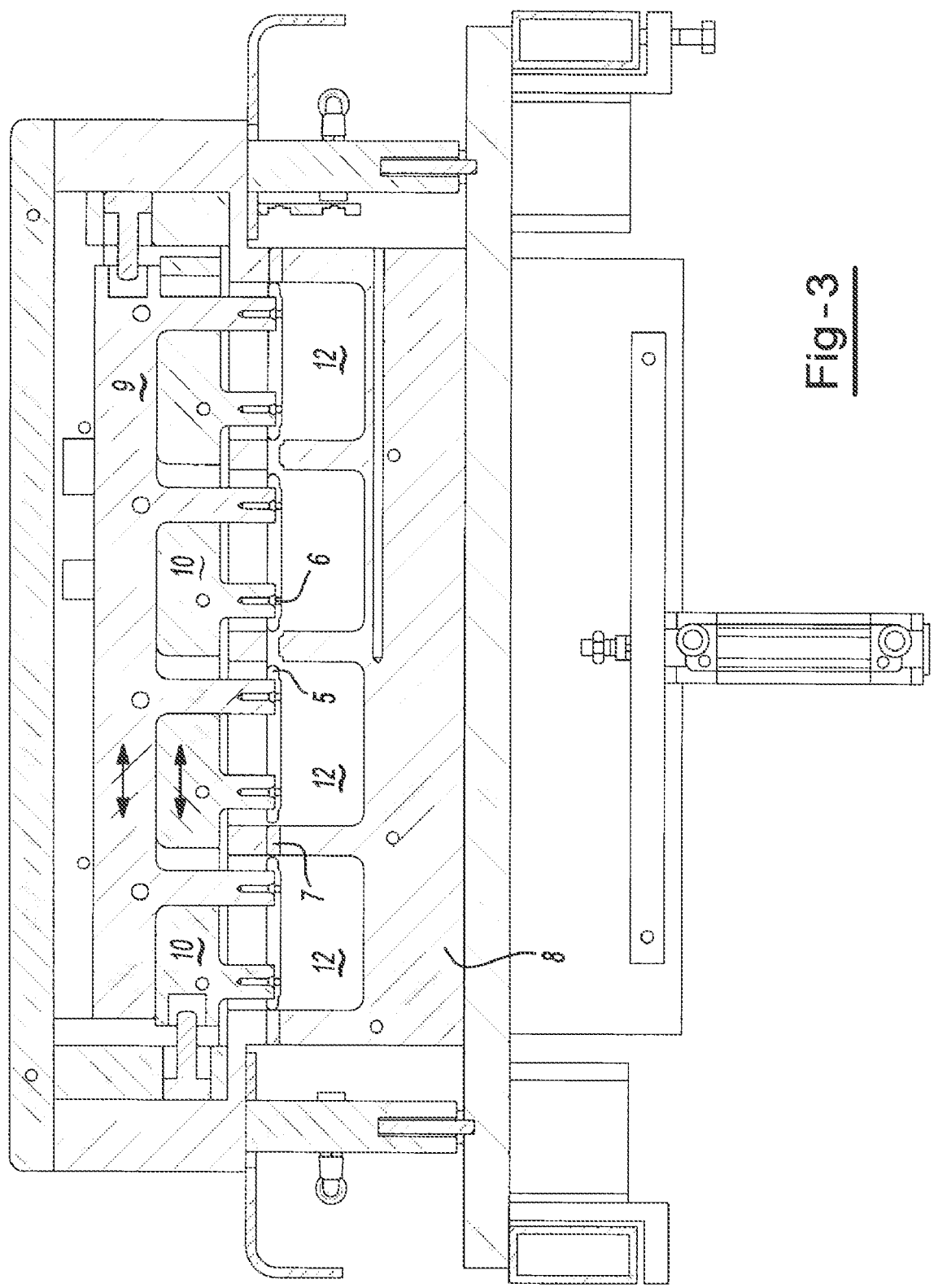
FIG. 3 shows the packaging machine according to the invention with the embossing means and FIG. 4 shows further details of the embossing means according to FIG. 3.

FIG. 3 represents the embossing means of the packaging machine according to the invention. The packaging tray (not shown) closed with a lid 2 is transported into the plane of the paper and stopped for a short time in recesses 12 of die 8. As soon as the packaging is located inside recess 12 in a stationary position, embossing means 5, 6, which are located on displacement means 9, 10, are lowered and displaced to the right or to the left, so that they engage with the packaging and mould the respective connection elements essentially simultaneously into the lid and into the packaging tray. During the moulding, embossing means 5, 6 cooperate with counter-bearings 7, which are arranged on die 8. As soon as the connection elements of the form-fit connection have been produced, the dies are again moved back and the packages thus completed are transported one cycle onwards. The movement of adjustment elements 9, 10 is represented by the two double arrows. Due to the fact that the form-fit connections are parallel to the direction of transport of the packaging, die 8 does not have to be designed lowerable, and this represents a considerable design advantage. Embossing means 5, 6 can be designed heatable.

Figure 4:
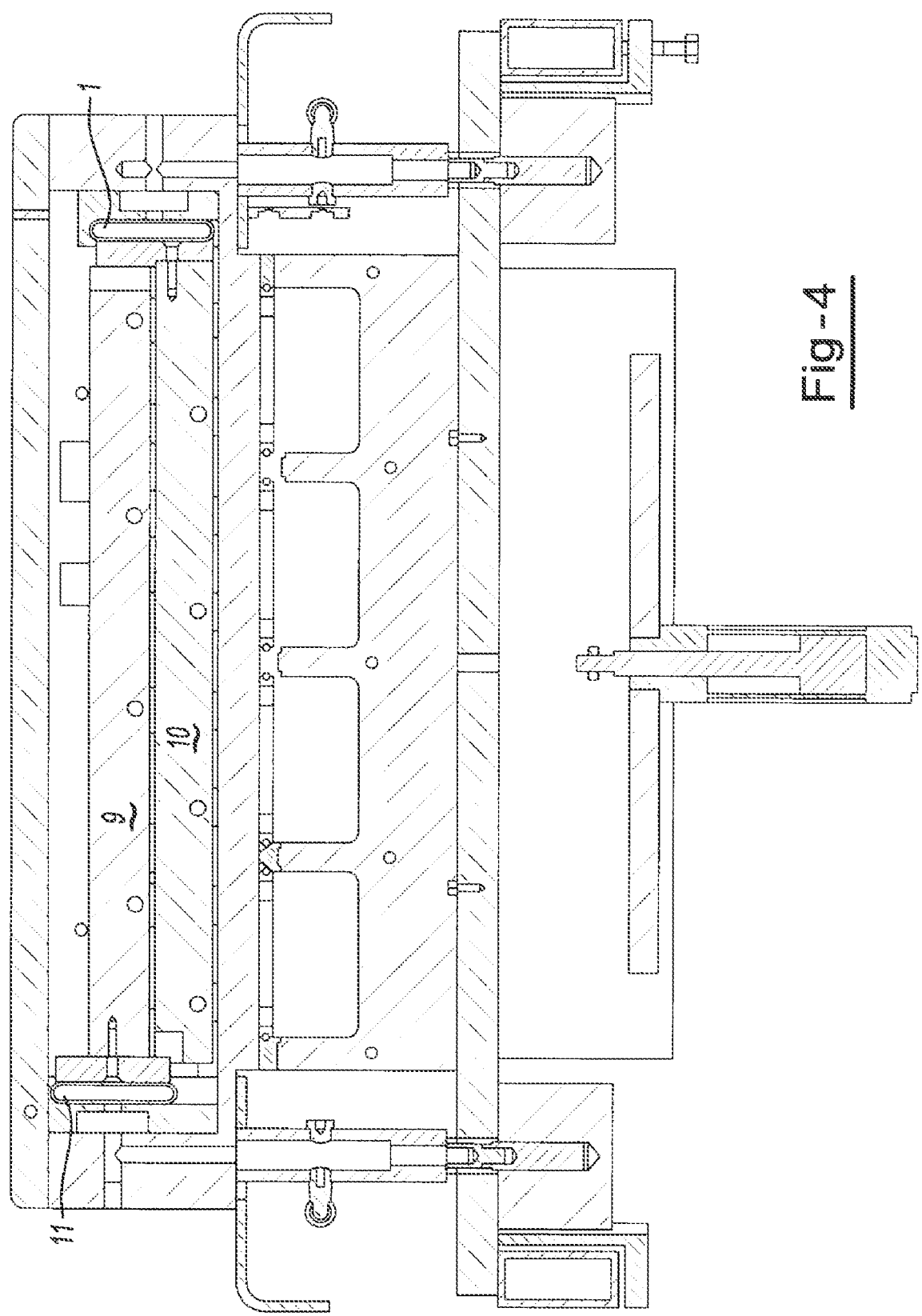

FIG. 4 essentially corresponds to FIG. 3, whereby in the present case tubes 11 are also represented, with which the displacement of adjustment means 9, 10 perpendicular to the direction transport of the film web is brought about.

LIST OF REFERENCE NUMBERS 1 packaging
2 packaging tray
3 lid
4 form-fit connection
4', 4" connection elements of the form-fit connection, groove, tongue
5, 6 embossing means
7 counter-bearing
8 die
9, 10 displacement means
11 tube
12 chamber inside die 8

The invention claimed is:

1. A packaging machine comprising: (a) a sealing station at which a lid is sealed to a plastic film tray that has been deep-drawn from a film web that is transported in a transport direction, and (b) embossing means with which at least one connection element is moulded into a packaging, the embossing means being lowered and displaced laterally, so that when lowered and displaced laterally, the embossing means laterally deforms the tray and the sealed lid essentially simultaneously to form the at least one connection element.

2. The packaging machine according to claim 1, characterised in that the embossing means are mounted so as to be displaceable perpendicular to the direction of transport of the film web.

3. The packaging machine according to claim 2, characterised in that the embossing means cooperate with counter-bearings; and the packaging machines produces a packaging with a packaging tray, into which a product for packing can be filled and which is closed with a lid, whereby at least one form-fit connection connects the packaging tray with the lid and the connection comprises a first and a second connection element characterized in that at least one connection element has been moulded at least partially into the packaging after the packaging tray has been closed with the lid.

4. The packaging machine according to claim 3, characterised in that the embossing means are positioned downstream of the sealing station in relation to the running direction of the film from which the packaging tray and the lid is produced; and the packaging machine produces a packaging with a packaging tray from a plastic film, into which a product for packing is filled and which is closed with a lid, whereby at least one form-fit connection connects the packaging tray with the lid and the connection comprises a first and a second connection element characterized in that at least one connection element has been moulded at least partially into the packaging after the packaging tray has been closed with the lid.

5. The packaging machine according to claim 1, characterised in that the embossing means cooperate with counter-bearings; and the packaging machine produces a packaging with a packaging tray, into which a product for packing is filled and which is closed with a lid, so that at least one form-fit connection connects the packaging tray with the lid and the connection comprises a first and a second connection element characterized in that at least one connection element has been moulded at least partially into the packaging after the packaging tray has been closed with the lid.

6. The packaging machine according to claim 1, characterised in that the embossing means are positioned downstream of the sealing station in relation to the transport direction of the film from which the packaging tray and the lid is produced; and the packaging machine produces a packaging with a packaging tray, into which a product for packing is filled and which is closed with a lid, whereby at least one form-fit connection connects the packaging tray with the lid and the connection comprises a first and a second connection element characterized in that at least one connection element has been moulded at least partially into the packaging after the packaging tray has been closed with the lid.

7. The packaging machine according to claim 1, characterized in that the embossing means are configured to produce an elongated tongue and groove connection element.

8. The packaging machine according to claim 1, characterized in that the embossing means are configured to produce an elongated tongue and groove connection element parallel to the direction of transport of the packaging in the machine.

9. The packaging machine according to claim 1, characterized in that the machine includes a die, which is not lowerable, that receives the packaging.

10. A packaging machine comprising: (a) a die that receives a packaging that is transported in a packaging transport direction from a sealing station at which a lid is sealed to a plastic film tray that has been deep-drawn from a film web that is transported in a web transport direction, and (b) embossing means with which at least one connection element is moulded essentially simultaneously into the tray and the lid of the packaging, the embossing means being lowered and displaced laterally in a direction that is perpendicular to the web transport direction, so that the embossing means laterally deforms an upwardly projecting sidewall of the tray and the sealed lid essentially simultaneously to form an elongated tongue and groove connection element parallel to the packaging transport direction in the machine, such connection element being moulded at least partially into the packaging after the tray has been closed with the lid.

11. The packaging machine according to claim 10, characterized in that the die is not lowered during operation.

12. The packaging machine according to claim 10, characterized in that the embossing means is configured to produce a pointed tongue in the lid and a pointed groove in the tray.

13. The packaging machine according to claim 10, characterized in that the embossing means forms a plurality of form fit connections in a packaging.

14. The packaging machine according to claim 10, characterized in that the embossing means cooperate with counter-bearings arranged on the die.

* * * * *